Patented Dec. 5, 1950

2,532,558

UNITED STATES PATENT OFFICE 2,532,558

PEST CONTROL COMPOSITIONS FOR THE CONTROL OF BACTERIA AND FUNGI CONTAINING 1,2-DIACYLETHYLENE

James E. Kirby, Wilmington, Del., assignor to E. I. du Pont de Nemours & Company, Wilmington, Del., a corporation of Delaware No Drawing. Application March 14, 1946, Serial No. 654,513

7 Claims. (Cl. 167—22)

This invention relates to pest control and to a method of disinfecting and preserving organic matter from pests. More particularly this invention relates to new pest control compositions for the control of bacteria, fungi and insects. Still more particularly this invention relates to products containing microorganism devitalizing compositions or bacteriostatic agents comprising a 1,2-dicarbonylethylene.

Heretofore, the dialkyl maleates and fumarates and the maleimides have been known to possess pesticidal properties against bacteria and fungi. However, these materials possess disadvantages in that their bactericidal properties are not sufficiently pronounced in dilute solutions.

It is an object of the present invention to provide new and effective pest control compositions for controlling economically harmful lower forms of life, such as bacteria, fungi and insects which prey on living and non-living organic matter, whether such matter is in its natural or fabricated state. A further object of this invention is to provide new pesticidal compositions containing, as essential active ingredients, certain 1,2-dicarbonylethylenes, which are highly effective in dilute solutions. A still further object is to provide bacteriostatic compositions which are highly effective in destroying or preventing the growth of bacteria, fungi and related organisms. A principal object of this invention is to disinfect and preserve plant and animal matter, whether in the natural or fabricated state, with compositions containing certain 1,2-dicarbonylethylenes.

These objects are accomplished by a pest control composition comprising, as an essential active ingredient, a 1,2-dicarbonylethylene having the formula

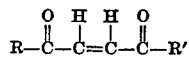

where R is monovalent and a member of the group consisting of alkyl, cycloalkyl, aryl, chloroaryl and heterocyclic radicals and R' is monovalent and a member of the group consisting of alkyl, cycloalkyl, aryl, and heterocyclic radicals. In a preferred embodiment R and R' are alkyl of from 1 to 6 carbon atoms. A dilute concentration of the 1,2-dicarbonylethylene in a carrier when brought in contact with the microorganism (bacteria, fungi or insects) produces a lethal effect. Products subject to attack by microorganisms are protected therefrom by contact with or incorporation therein of a bacteriostatic agent comprising the 1,2-dicarbonylethylene.

This invention is further illustrated by the following examples wherein the quantities, unless otherwise specified, are stated in parts by weight.

Example I 1,2-diacetylethylene was prepared by the method of Goldberg and Muller, Helv. Chim. Acta. 21, 1699 (1938). Bacteriostatic titers for this compound were determined for Staphylococcus aureus. The test which was used was conducted in the following manner: 5 cc. of double strength nutrient broth (Bacto Beef Extract—6 g., Bacto Peptone—10 g., distilled water 1000 cc.) inoculated with Staphylococcus aureus was added to 5 cc. of a solution of known dilution of the test compound. The resulting solution therefore contained the test compound in a dilution twice as great as did the original solution. For example if 5 cc. of double strength broth is added to 5 cc. of a 1:1000 dilution of the test compound, the final solution will be 10 cc. of a regular nutrient broth containing 1:2000 dilution of the test compound. The tubes so prepared were then incubated for 48 hours at 37° C. and read either positive (+) or negative (—) indicating growth (+) or no growth (—) of the organism.

The inoculum used above was 0.1 cc. of 24 hour Food and Drug Administration strain of Staphylococcus aureus to 100 cc. of the regular strength nutrient broth.

Under the conditions of this test the above 1,2-dicarbonylethylene compound showed bacteriostatic activity against Staphylococcus aureus at aqueous dilutions of 1:256,000.

At an aqueous dilution of 1:2000 neither diethyl maleate nor diethyl fumarate showed bacteriostatic activity against Staphylococcus aureus.

Example II

The versatility of pesticidal action of the products of this invention is illustrated by the following fungicidal properties of the 1,2-dicarbonylethylenes of this invention. The product of Example I (1,2-diacetylethylene), when tested at a dilution of 1:32,000 was found to be an effective fungicide against the Penicillium sp. Likewise, this same compound was effective as a fungicide at a dilution of 1:16,000 against Aspergillus niger.

In contrast to the fungicidal activity of the 1,2-dicarbonylethylenes of this invention, it was found necessary to employ the relatively high concentrations of 1:250 of diethyl maleate to give effective controls of Penicillium sp. and Aspergillus niger. Likewise, a concentration of 1:1,000 of dimethyl fumarate appeared to be necessary to give fungicidal control of the same two organisms.

The 1,2-dicarbonylethylenes of this invention are also effective fungicides against a variety of other fungi including Trichoderma sp., Rhizoc-

*tonia solani, Lenzites trabea, Alternaria solani*, and *Ceratostomella pilifera*.

It is to be understood that other 1,2-dicarbonylethylenes aside from those specifically mentioned in the examples are contemplated in this invention. Diverse esters of various beta-acyl-substituted acrylic acids are also contemplated as well as various 1,2-diacyl-substituted ethylenes. The acyl substitutents in these two broad classes of compounds are derived from aliphatic, aryl and heterocyclic carboxylic acids and may include, aside from the acetyl of the examples, propionyl, butyryl, benzoyl, hexahydrobenzoyl, furoyl, tetrahydrofuroyl, thenoyl, beta-(1-naphthoyl), and beta-(2-naphthoyl). Particularly preferred embodiments of this invention contain alkyl of not more than 6 carbon atoms for the alkyl class; thienyl ($C_4H_3S-$) and furfuryl ($C_4H_3O-$) radicals for the heterocyclic class; phenyl for the aryl class; chlorophenyl for the chloroaryl class; and cyclohexyl for the cycloalkyl class.

Specific examples of 1,2-diacylethylenes include 1-acetyl-2-benzoylethylene, 1,2-dibenzoylethylene, 1,2-dithenoylethylene, and 1,2-difuroylethylene.

In general, the active agents of this invention may be formulated in a wide variety of ways as may be best suited to the control of any particular pest or combination of pests, having in mind the nature of the pest, its particular habitat, and feeding habits, and its peculiar susceptibilities. Thus suitable compositions may be prepared with the active agent in state of composition, subdivision, association with such other materials as carriers as may be necessary peculiarly to adapt the active agent to the purpose to be effected.

The compounds of this invention may be used in various combinations with such carriers or auxiliary materials as solvents, spreaders, stickers and other toxicants; for example with insecticides such as organic thiocyanates, rotenone, pyrethrum, phenothiazine, hexachlorocyclohexanes, 2,2-bis(p-chlorophenyl)-1,1,1-trichloroethane, 2,2-bis(p-methoxy)-1,1,1-trichloroethane, with bactericides and fungicides such as the chlorinated phenols, the chlorinated cresols, the mercurial bactericides such as Metaphen, the copper acylates, copper chelates of salicylaldehyde, the long chain quaternary ammonium halides and derivatives of dithiocarbamic acid, such as ferric dimethyl dithiocarbamate.

They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or caster oil or the sulfonated petroleum oils; with diluents such as calcium phosphate, Bancroft clay, kaolin, diatomaceous earth, pyrophylite, talc, bentonite, flours such as walnut shell, wheat, redwood, soya bean, cottonseed, or with solvents such as water, alcohol, acetone, and hydrocarbon solvents. Such mixtures as are here set out may have particular usefulness in special applications and frequently will give better results than may be obtained from the pesticidal action of the ingredients when used alone.

The compounds of this invention are particularly useful as bacteriostatic agents and fungicides. Thus the agents of this invention may be used to especial advantage as preservatives for such substances as raw hide, glue, gelatin, leather, cellulosic substances, casein products, and other natural or manufactured products that are subject to attack or decomposition by various bacteria and molds.

The term "fungicide" and "insecticide" as used herein shall, except as otherwise qualified, be construed in accordance with the insecticide act of 1910, section 6 and the regulations for its enforcement (issued October 1941, U. S. Department of Agriculture). The term "pest control" shall, except as otherwise qualified, be construed in accordance with the U. S. Patent 2,165,030 (issued July 4, 1939, and filed May 20, 1937) and refers to substances which are useful in controlling or combating economically lower forms of life whether this control be brought about through a repellent action only or by an actual toxic effect from external contact or through absorption into the alimentary tract or by a paralytic effect, or by any combination of these several effects. The term "pest control" as used herein is considered a generic expression including such terms as germicide, fungicide, insecticide, vermicide, antiseptic, mothicide, aphicide, bactericide and the like.

As many apparently widely different embodiments of this invention may be made without departing from the spirit and scope thereof, it is to be understood that I do not limit myself to the specific embodiments thereof except as defined in the appended claims.

I claim:

1. A pest control composition for the control of bacteria and fungi comprising in dilute aqueous solution a wetting agent and a 1,2-diacylethylene having formula

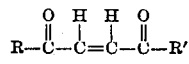

where in the acyl groups

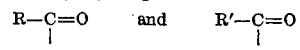

contain from 2 to 7 carbon atoms and are selected from the class consisting of alkanoyl and aroyl groups, said 1,2-diacylethylene being an essential active ingredient therein.

2. A pest control composition for the control of bacteria and fungi as set forth in claim 1 wherein said wetting agent is an alkali metal salt of a sulfonated petroleum oil.

3. A pest control composition for the control of bacteria and fungi comprising in dilute aqueous solution a wetting agent and a 1,2-diacylethylene having the formula

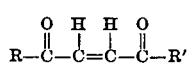

wherein the acyl groups

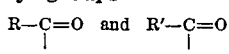

are alkanoyl groups containing from 2 to 7 carbon atoms, said 1,2-diacylethylene being an essential active ingredient therein.

4. A pest control composition for the control of bacteria and fungi comprising in dilute aqueous solution a wetting agent and 1,2-diacetylethylene, said 1,2-diacetylethylene being an essential active ingredient therein.

5. A pest control composition for the control of bacteria and fungi as set forth in claim 4 wherein said wetting agent is an alkali metal salt of a sulfonated petroleum oil.

6. A pest control composition for the control of bacteria and fungi comprising in dilute aqueous solution a wetting agent and 1,2-dibenzoylethylene, said 1,2-dibenzoylethylene being an essential active ingredient therein.

7. A pest control composition for the control of bacteria and fungi comprising in dilute aqueous solution a wetting agent and a 1,2-diacylethylene wherein the acyl groups are aroyl of 7 carbon atoms of which at least one is chlorobenzoyl, said 1,2-diacylethylene being an essential active ingredient therein.

JAMES E. KIRBY.

REFERENCES CITED

The following references are of record in the file of this patent:

UNITED STATES PATENTS

| Number | Name | Date |
| --- | --- | --- |
| 2,107,298 | Kilgore | Feb. 8, 1938 |
| 2,357,260 | Joyce | Aug. 29, 1944 |

OTHER REFERENCES

Goldberg et al., Chemical Abstracts, vol. 33, 1939, page 1750.

Linduska et al., OSRD Insect Control Committee Report No. 28. Interim Report No. 0-94. May 18, 1945. Pages 1, 9, 34.

Geiger et al., Article in "Jour. Am. Chem. Soc., vol. 67, Jan. 1945, pages 112-116.